US006623176B2

(12) United States Patent
Jack et al.

(10) Patent No.: US 6,623,176 B2
(45) Date of Patent: Sep. 23, 2003

(54) OPTICAL FIBER ASSEMBLY AND METHOD FOR SUPPRESSING OPTICAL INSTABILITIES DUE TO IMPROPERLY CURED EPOXY

(75) Inventors: Curtis A. Jack, Rockland Township, PA (US); John W. Osenbach, Kutztown, PA (US)

(73) Assignee: Triquint Technology Holding Co., Hillsboro, OR (US)

( * ) Notice: Subject to any disclaimer, the term of this patent is extended or adjusted under 35 U.S.C. 154(b) by 40 days.

(21) Appl. No.: 09/927,372

(22) Filed: Aug. 13, 2001

(65) Prior Publication Data

US 2003/0068138 A1 Apr. 10, 2003

(51) Int. Cl.$^7$ .................................................. G02B 6/36
(52) U.S. Cl. ............................. 385/80; 385/78; 385/84
(58) Field of Search .................. 385/80, 76, 77, 385/78, 84, 88, 139

(56) References Cited

U.S. PATENT DOCUMENTS

| 4,482,201 A | * | 11/1984 | Dousset ........................ 385/80 |
| 4,673,245 A | * | 6/1987 | Kling et al. .................. 385/80 |
| 6,045,271 A | * | 4/2000 | Shimoji et al. ............... 385/85 |
| 6,086,704 A | | 7/2000 | Kanai et al. |

* cited by examiner

*Primary Examiner*—Andrey Chang
*Assistant Examiner*—Denise S. Allen
(74) *Attorney, Agent, or Firm*—Dickstein Shapiro Morin & Oshinsky LLP

(57) ABSTRACT

An optical fiber assembly including a ferrule which increases the glass transition temperature of an entire epoxy system resident within the ferrule and a method for suppressing optical instabilities of an optoelectronic package are described. One or more openings are made in a ferrule body to allow reaction gases from the epoxy caused during curing to escape, allowing a greater portion of the epoxy to fully cure, thereby raising the glass transition temperature of the epoxy system.

17 Claims, 8 Drawing Sheets

GENERAL MODULUS FOR DIFFERENT Tg

OPTICAL FIBER ASSEMBLY AND METHOD FOR SUPPRESSING OPTICAL INSTABILITIES DUE TO IMPROPERLY CURED EPOXY

FIELD OF THE INVENTION

The present invention is generally directed to optical fiber assemblies, and more particularly to an optical fiber assembly which allows sufficient curing of an interiorly positioned epoxy to provide optical stability to the optical fiber.

BACKGROUND

Several different techniques are known for attaching optical fibers to optoelectronic packages. Two of the more widely used techniques are solder attachment of a metallized optical fiber in a metal sleeve mounted to a wall of an optoelectronic package, and laser welding of an optical fiber assembly to a wall of an optoelectronic package.

When optical fibers are, for example, laser welded to optoelectronic packages, the alignment and positioning of the fiber relative to the optical axis of the optoelectronic package is performed by way of active alignment. Specifically, the optoelectronic package is held in a fixture that provides mechanical stability, spatial positioning, spatial manipulation and electrical biasing for the optoelectronic elements within the package. The optoelectronic elements generally include at least an optical element, such as, for example, a laser diode, photodiode, or lens, an optical fiber assembly including a metal ferrule at one end to be attached to the package and a bare fiber or optical connector, a light source, and a detector. The light source may be a solid state laser inside of the optoelectronic package or a laser source connected to the connector end of the fiber. The detector may be the photodiode or a detector at the connector end of the fiber.

The optical fiber assembly is held in the fixture, and the connector is connected either to a photodetector, in the case of a laser within the package, or to a laser in the case of a photodiode within the package. An electrical bias is then applied to the optoelectronic elements within the package. While the bias is applied, the package and/or the optical fiber is spatially manipulated to find a position which provides a desired level of optical power to the detector. Once the desired level is obtained, the optical fiber and the ferrule are affixed to the optoelectronic package by laser welding.

Typically, laser welding utilizes a high power laser source, such as a YAG laser, and the laser source is positioned to direct light onto the fiber and the portion of the ferrule in contact with the optoelectronic package. When the YAG laser is modulated, the metallic ferrule absorbs the energy locally, causing the temperature of the ferrule and the package to rapidly rise and eventually causing the ferrule and the package to melt locally such that a weld joint between the optoelectronic package wall and the ferrule is formed.

FIGS. 1–2 illustrate an optical fiber assembly 10, which includes an optical fiber 12 positioned within a ferrule 20. The ferrule 20 includes a metallized body 22 with a thin wall section 26 surrounding a defined interior space 24 and a thick wall section 28 surrounding a channel 30. A midsection of the ferrule body 22, shown between a pair of dashed lines in FIG. 2 and designated generally as element 36, is located between a ferrule body first end 32 and a ferrule body second end 34. The channel 30 leads from the defined interior space 24 to the body second end 34.

The fiber 12 extends through the ferrule 20. The end of the fiber 12 nearest the body first end 32 extends through a channel 16 of a jacket 14. An epoxy 40 fills out the space remaining in the defined interior space 24 and the channel 30 after positioning of the fiber 12 and the jacket 14. The spacing between the fiber 12 and the wall of the channel 30, as well as the spacing between the jacket 14 and the inner wall of the ferrule body 22 is small, typically on the order of a few microns. Such small spacing minimizes the potential for movement of the optical fiber 12. The spacing between the fiber 12 outside of the jacket 14 but within the defined interior space 24 and the inner wall of the ferrule body 22 is significantly larger than the spacing between either the fiber 12 and the wall of the channel 30 or between the jacket 14 and the inner wall of the ferrule body 22. Although an epoxy is shown in the defined interior space 24 in FIG. 2, other materials, such as, for example, a ceramic or other hard material insert may also be placed within the defined interior space 24.

The epoxy 40 is utilized to attach the fiber 12 to the wall of the channel 30 and to the inner wall of the ferrule body 22. The epoxy 40 is inserted within the ferrule 20 in a liquid or semi-liquid form, and during the epoxy cure cycle, the epoxy within the channel 30 and between the jacket 14 and the inner wall of the ferrule body 22 typically cures faster than the epoxy 40 residing in the remainder of the defined interior space 24. The variable curing time is due to a lesser volume in and a more efficient heat transfer through the small open-spaced regions, namely within the channel 30 and between the jacket 14 and the inner wall of the ferrule body 22, than in the large open-spaced region, namely the remainder of the defined interior space 24.

Because the epoxy 40 in the small open-spaced regions cures faster than the epoxy 40 in the large open spaced region and because the small open-spaced regions are on either side of the large open-spaced region, the curing time in the large open-spaced region is further retarded. Curing of the epoxy 40 leads to the production of gaseous reaction products in accordance with Equation 1 below:

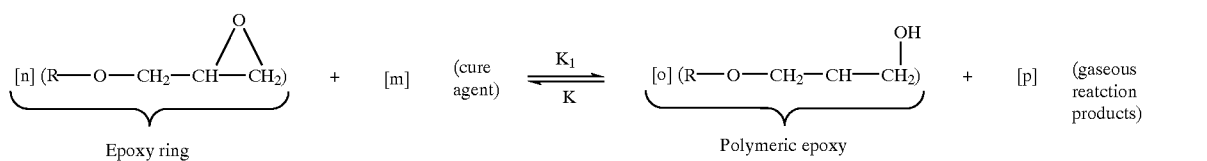

Equation 1

$$[n]\ (R-O-CH_2-CH\overset{O}{\overset{\diagup\diagdown}{-}}CH_2) \;+\; [m]\ \text{(cure agent)} \;\underset{K}{\overset{K_1}{\rightleftharpoons}}\; [o]\ (R-O-CH_2-\overset{OH}{\underset{|}{CH}}-CH_2) \;+\; [p]\ \text{(gaseous reaction products)}$$

Epoxy ring           Polymeric epoxy

The nomenclature [m], [n], [o] and [p] are constants for balancing out Equation 1. Diffusion of the gaseous reaction products is slower through cured epoxy than through non-cured epoxy. The slower diffusion rates of the epoxy 40 in the small open-spaced regions leads to a build up of gaseous reaction products in the large open spaced region.

The build up of the gaseous reaction products further retards the curing time of the epoxy 40 in the large open spaced region. As illustrated in the equation above, epoxy rings react with a curing agent when energy, such as heat or light, is applied to the system to form a polymeric epoxy material plus the gaseous reaction products. In an equilibrium, Equation 1 above is constant. In other words, as noted in Equation 2 below:

$$\text{Constant} = \frac{[\text{Polymeric epoxy}]^o [\text{gaseous reaction products}]^p}{[\text{Epoxy ring}]^n [\text{Cure agent}]^m} = \frac{k_1}{k_2} \quad \text{Equation 2}$$

Since the total gaseous reaction products are composed of the gaseous reaction products from new reactions and the trapped gaseous reaction products, and given that the epoxy 40 within the ferrule 20 is an equilibrium system, then as the amount of trapped gaseous reaction products increases, the reaction rate defining the formation of polymeric epoxy decreases. Thus, the ferrule assembly 10 has the potential for creating a system in which the epoxy 40 in the large open spaced region, and especially in the mid-section 36, never fully cures.

The state of cure of epoxy can be defined with reference to its glass transition temperature $T_g$, which may be defined as the temperature range at which the mechanical properties of a material, in this case epoxy, change such that above the range the epoxy is elastic and below that range the epoxy is brittle. FIG. 3 illustrates the general elastic modulus behavior for a defined epoxy system over a temperature range. The same starting epoxy system, cured to a different degree, namely to a different $T_g$, is shown in the graph. As shown in FIG. 3, the general elastic modulus behavior of an epoxy system increases with an increasing $T_g$, while the magnitude of the temperature range over which there is a significant change in the general elastic modulus behavior increases with decreasing $T_g$.

The change in general elastic modulus behavior with a change in $T_g$ translates into a change in the magnitude and time dependence of the reversible strain which can occur when a stress is applied to the epoxy at a given temperature, as illustrated in FIG. 4, which plots the reversible strain of the epoxy systems of FIG. 3 over time for a given applied stress. The time is given in arbitrary units arbs. The temperature is held constant near the temperature where the onset of the change in the general elastic modulus behavior for the lowest $T_g$ cured epoxy shown in FIG. 3 occurs. The strain is defined as the length of an epoxy under non-permanent, or reversible, strain ($X_2$) minus the length of the epoxy under no strain ($X_1$) divided by $X_1$. As FIG. 4 indicates, a lower $T_g$ leads to a larger reversible strain with longer time constants than a higher $T_g$ at a given stress and temperature.

For optoelectronic packages that use laser welding to attach a fiber ferrule, such as the fiber ferrule 20 shown in FIGS. 1–2, the optical stability at any given temperature is influenced to a large degree by the reversible strain behavior of the epoxy 40. Generally, the larger the reversible strain of the epoxy 40 the greater the potential for shifts in the optical power transmitted or received from the optical package due to changes in the optical alignment. In addition, the longer the time dependence the more probable it will be that the change in optical power will occur after the optoelectronic package has passed various manufacturing screens and is in a third party's operating system. Such an optoelectronic package is likely to fail in the field.

FIG. 5 illustrates an optoelectronic package operated under system conditions for approximately 170 hours. Starting from time equals zero, the power output begins to degrade, and eventually degrades by about 1.2 dB. The power output degradation can be traced back to an improperly cured epoxy in the large open spaced region of the ferrule 20.

There exists a need to provide a ferrule which compensates for the variable curing time of epoxy, and thereby reduces the number of optoelectronic packages which fail in the field due to improperly cured epoxy induced power output degradation.

SUMMARY

The invention provides optical fiber assembly that includes a ferrule having a ferrule body and a fiber extending through said ferrule body. The ferrule body extends between first and second ends and defines a defined interior space. One or more openings extend through the ferrule body to the defined interior space.

The invention further provides an optoelectronic package that includes an optical subassembly and an optical fiber assembly attached to the optical subassembly. The optical fiber assembly includes a ferrule having a ferrule body and a fiber extending through said ferrule body. The ferrule body extends between first and second ends and defines a defined interior space. One or more openings extend through the ferrule body to the defined interior space.

The invention further provides a method for suppressing optical instabilities in an optoelectronic package. The method includes creating one or more openings in a ferrule, inserting a fiber in the ferrule, injecting an epoxy in the ferrule, curing the ferrule, and attaching the ferrule to an optical subassembly.

The foregoing and other advantages and features of the invention will be more readily understood from the following detailed description of the invention, which is provided in connection with the accompanying drawings.

DETAILED DESCRIPTION OF PREFERRED EMBODIMENTS

Figure 6:
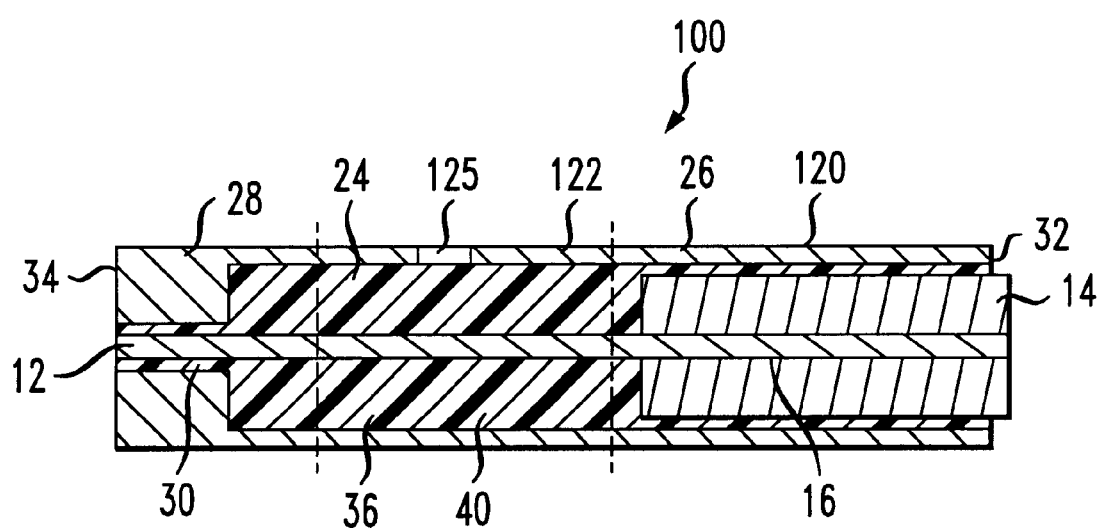
FIG. 6 is a cross-sectional view of an optical fiber assembly constructed in accordance with an embodiment of the invention.

With specific reference to FIG. 6, an optical fiber assembly 100 is shown including a ferrule 120. The ferrule 120 includes a body 122 which surrounds a defined interior space 24. The body 122 has a thin wall section 26 which extends from a body first end 32 to a thick wall section 28. One end of the thick wall section 28 faces the defined interior space 24, while the other end is the body second end 34.

An optical fiber 12 extends through the ferrule 120. At the body first end 32, the fiber 12 is positioned within a jacket 14 which fits within the defined interior space 24. The fiber 12 fits within a channel 16 of the jacket 14 and extends into and through a channel 30 of the thick wall section 28. There is a small clearance between the jacket 14 and the inner wall of the ferrule body 122 and a small clearance between the fiber and the wall of the channel 30. However, there is a large clearance between the fiber 12 and the inner wall of the ferrule body 122 in the portion of the defined interior space 24 not occupied by the jacket 14. This large open spaced region includes a mid-section 36 defined as existing between the two illustrated dashed lines. An epoxy 40 is injected into the defined interior space 24 to adhere the fiber 12 to the wall of the channel 30.

One or more openings 125 extend through the ferrule body 122 in the mid-section 36. Only one opening 125 is shown in FIG. 6 for simplicity of illustration only. The openings 125 act as breath holes to allow reaction gases in and around the center of the ferrule 120 to diffuse through a much larger area that is less filly cured at short cure times than the ferrule 20 shown in FIGS. 1–2.

The optimal number, size and/or spacing of the openings 125 is based upon the volume of the large open spaced region 24 filled with the epoxy 40, the length of the ferrule 122, and more especially the length of the large open spaced region 24 and the diameter of the ferrule 122. Due to the relationship between the length, volume and diameter of the ferrule 122 and the number, size and spacing of the openings 125, the number, size and spacing of the openings 125 may be chosen to optimize the escape of reaction gases from the epoxy 40. For example, for a ferrule 120 having a diameter of approximately three millimeters and a length of approximately nine millimeters, a single opening 125 having a diameter of about one millimeter may preferably be machined or otherwise created in the ferrule body 122. For ferrules 120 of greater length or greater diameter, more than one opening 125 may be required.

Generally, the ratio of the total diameters of the openings 125 to the length of the ferrule 120 should be within the range of about 1:10 to 1:5. Diameters less than one-tenth the length of the ferrule 120 may be insufficient to allow enough gases to evolve. Diameters greater than one-fifth the length of the ferrule 120 may prevent proper curing of the curable material 40 and may lead to other problems. Preferably, the openings 125 should be located where the greatest volume of curable material 40 is positioned, since the openings 125 are primarily used to allow gases from the curable material 40 to evolve and not retard the curing process. Specifically, the openings 125 should be located in the mid-section 36. The openings 125 may be positioned equidistant from one another around the circumference of the ferrule body 122.

It is necessary that the openings 125 be large enough to allow a channel through the epoxy 40 in the middle of the openings 125 to remain relatively uncured as compared to the epoxy 40 near the edges of the openings 125 so that reaction gases are allowed to escape. An opening 125 that has too small a diameter becomes easily plugged, since the epoxy 40 beneath the opening quickly cures.

Figure 7:
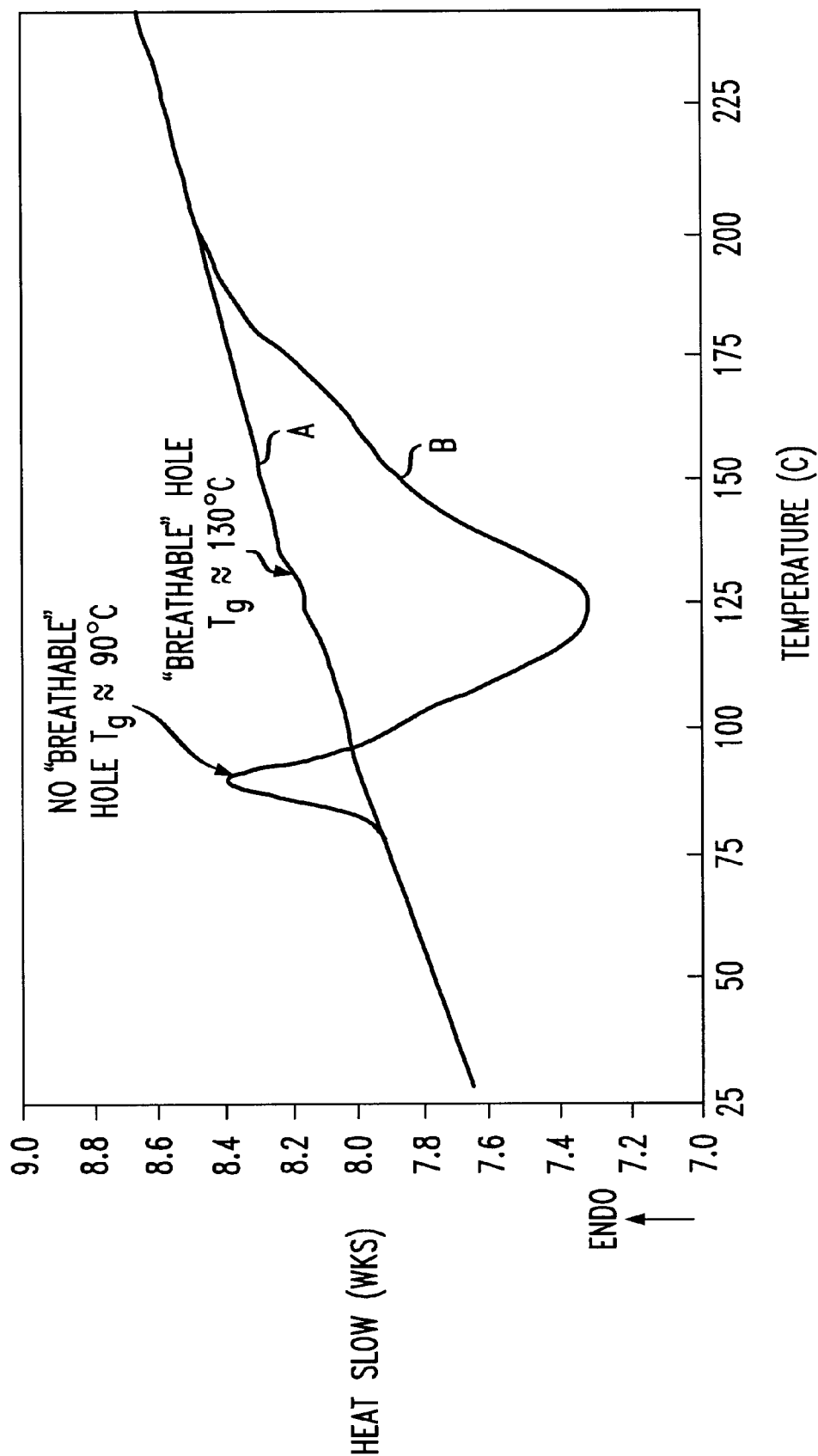
FIG. 7 is a graph showing a differential scanning calorimetry measurement, e.g., the heat transfer rate for a given mass over a given temperature range, for an as cured conventional ferrule and for the ferrule of FIG. 6.
Figure 8:
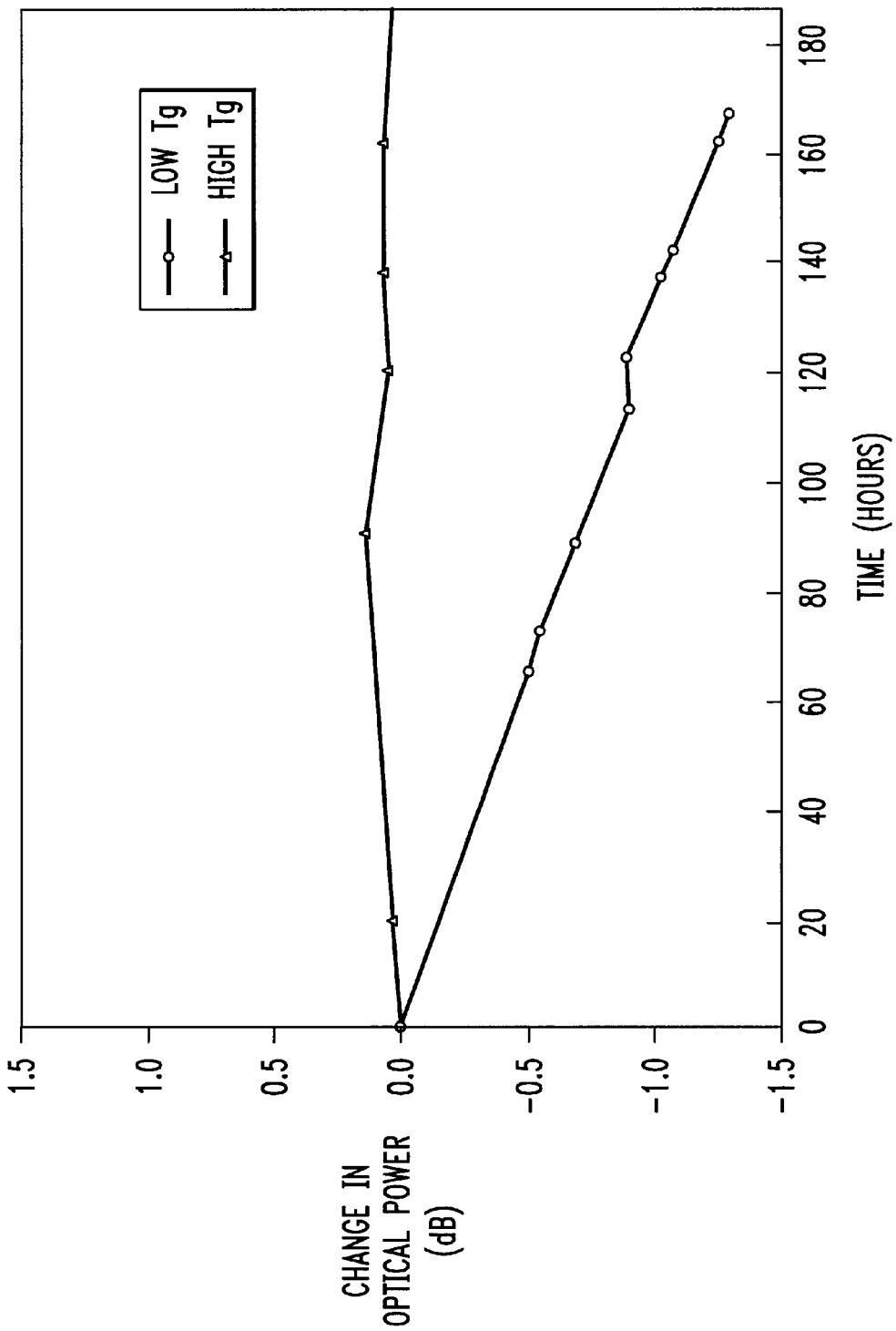
FIG. 8 is a graph like FIG. 5 comparing the optical stability of an optoelectronic package including the optical fiber assembly of FIG. 6 versus that of a conventional ferrule.

With reference to FIGS. 7–8, the effectiveness of openings 125 in a ferrule 122 is illustrated. FIG. 7 illustrates a differential calorimetry measurement, which is a measurement of the heat given off or absorbed necessary to cause a chemical reaction to go to completion at any given temperature. As shown in FIG. 7, by machining a one millimeter diameter opening 125 in a ferrule 120 that is nine millimeters in length and has a three millimeter diameter, the heat transfer rate for a given mass increases linearly with increasing temperature. Specifically, profile A shows the heat transfer rate as the curing temperature increases for an epoxy 40 within the ferrule 120 that has a $T_g$ of 130° C., while profile B shows the heat transfer rate for an epoxy 40 within a ferrule without an opening 125, such as ferrule 20. As indicated, the glass transition temperature of the epoxy of profile B is 90° C.

Figure 1:
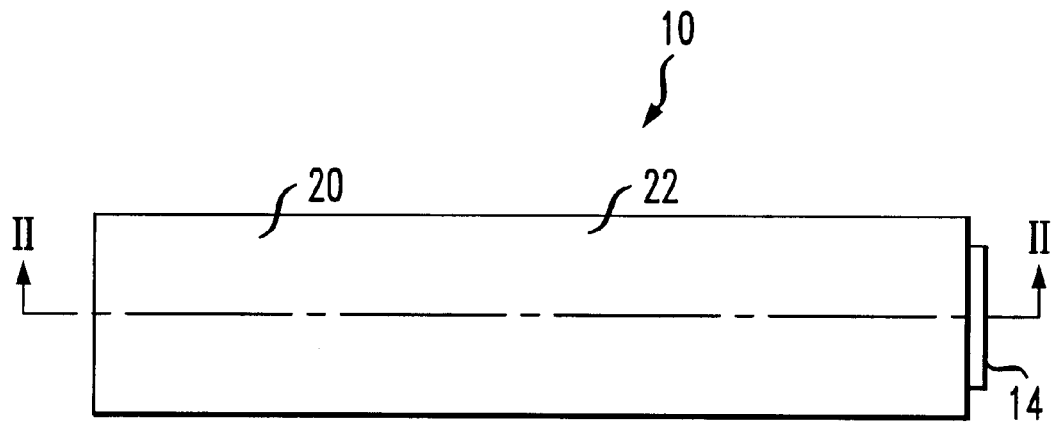
FIG. 1 is a side view of a conventional optical fiber assembly.
Figure 2:
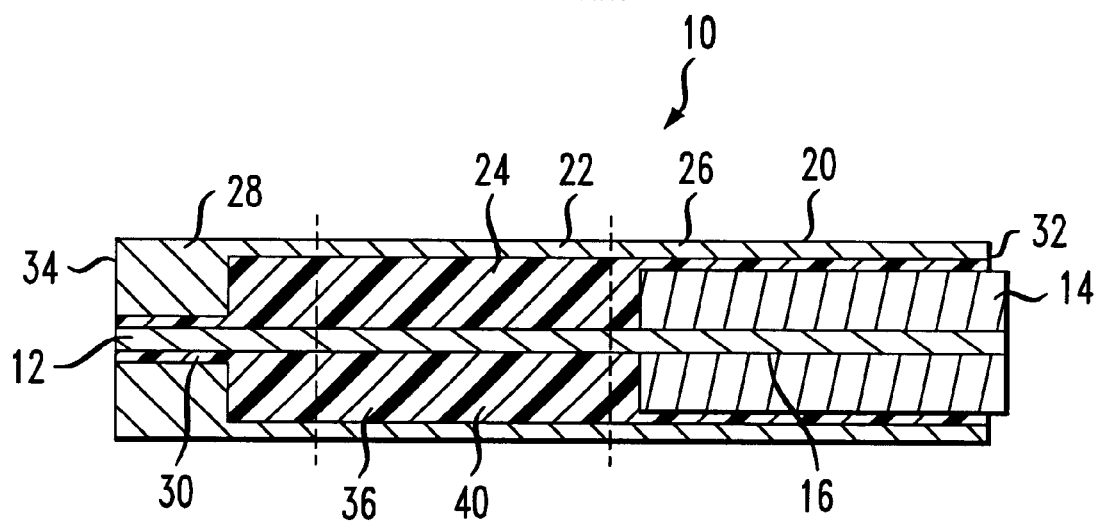
FIG. 2 is a cross-sectional view of the optical fiber assembly of FIG. 1 taken along line II—II.
Figure 3:
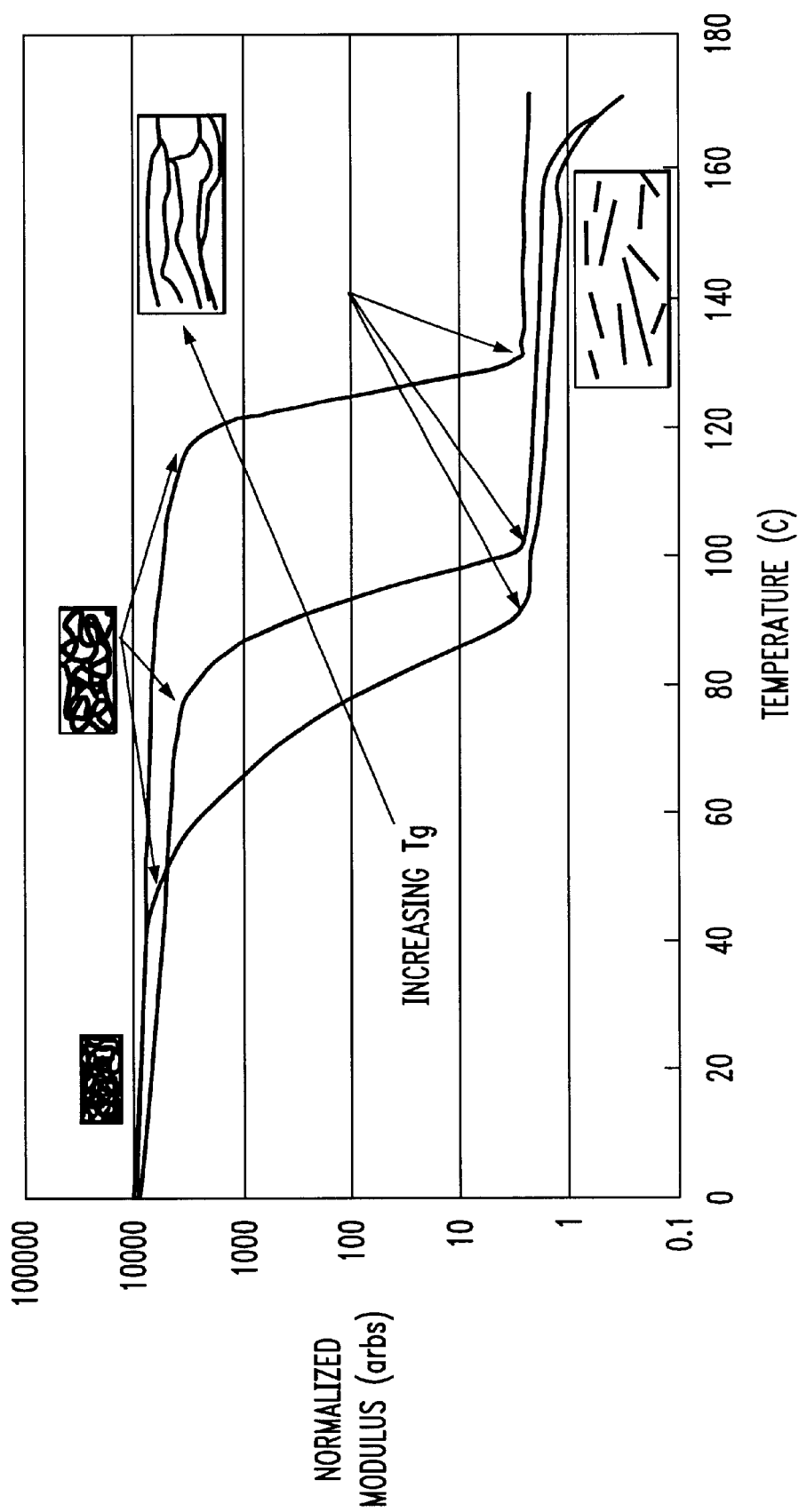
FIG. 3 is a graph of the general elastic modulus behavior for a defined epoxy system over a temperature range.
Figure 4:
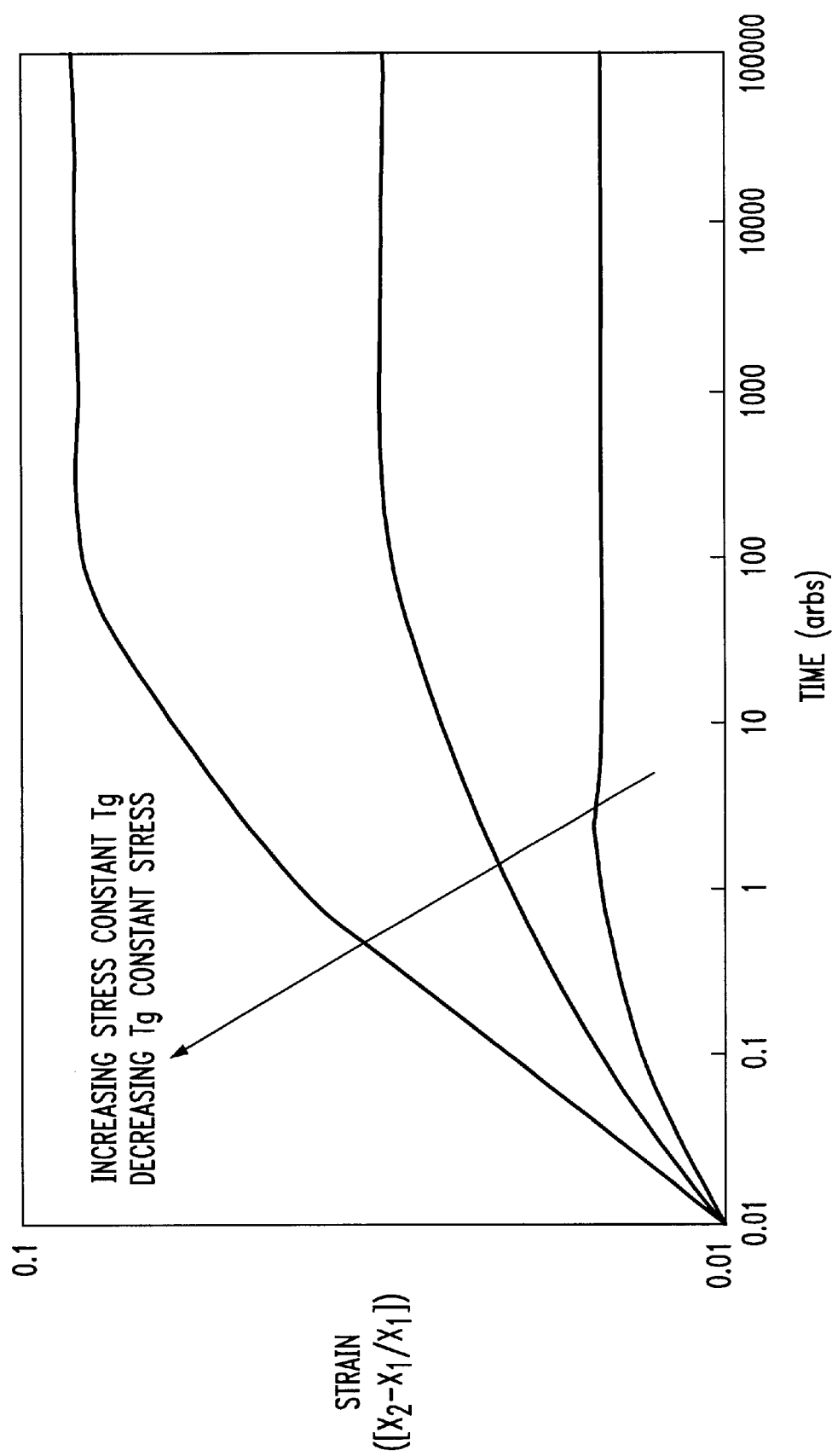
FIG. 4 is a graph of the reversible strain of the epoxy systems of FIG. 3 over time for a given applied stress.
Figure 5:
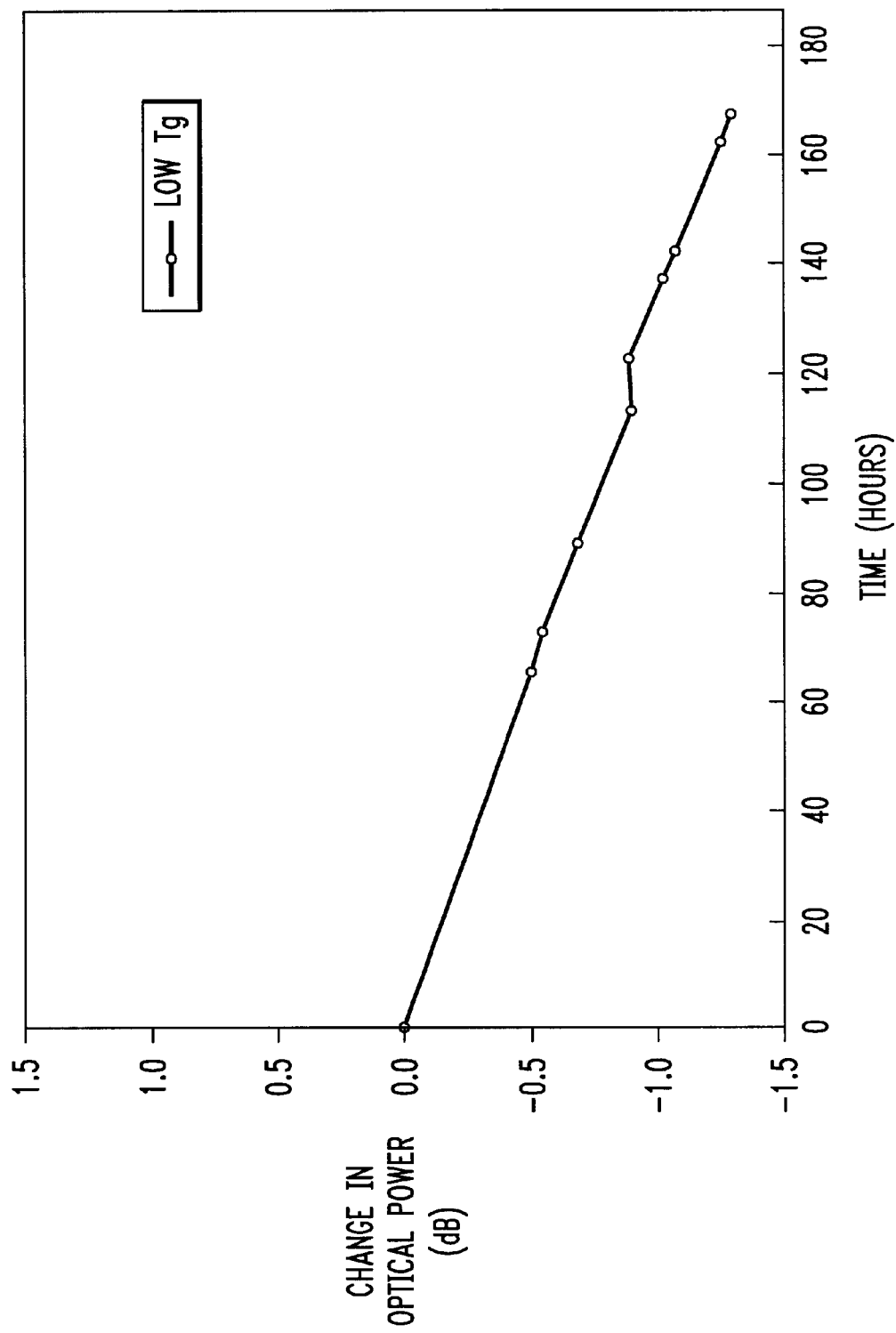
FIG. 5 is a graph of the change in power output over time for an optoelectronic package with improperly cured epoxy.

FIG. 8 compares the optical stability of an optoelectronic package 150 (FIG. 9), which includes the ferrule 122 with the openings 125 to an optoelectronic package that includes a ferrule 20 (FIGS. 1–2). The optoelectronic package 150 had fully cured epoxy within the ferrule 122 and showed virtually no change in the optical output power over time as opposed to the package with the ferrule 20 which had improperly cured epoxy and showed a degradation of about 1.2 dB over 170 hours.

Figure 9:
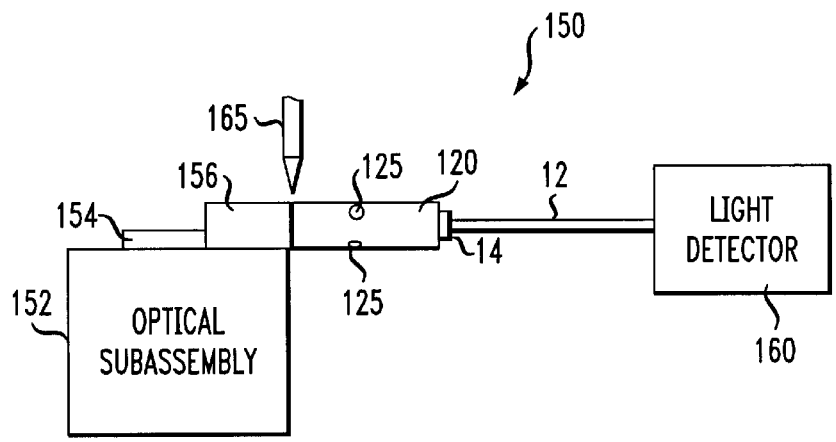
FIG. 9 is a schematic view of an optoelectronic package constructed in accordance with an embodiment of the invention.
Figure 10:
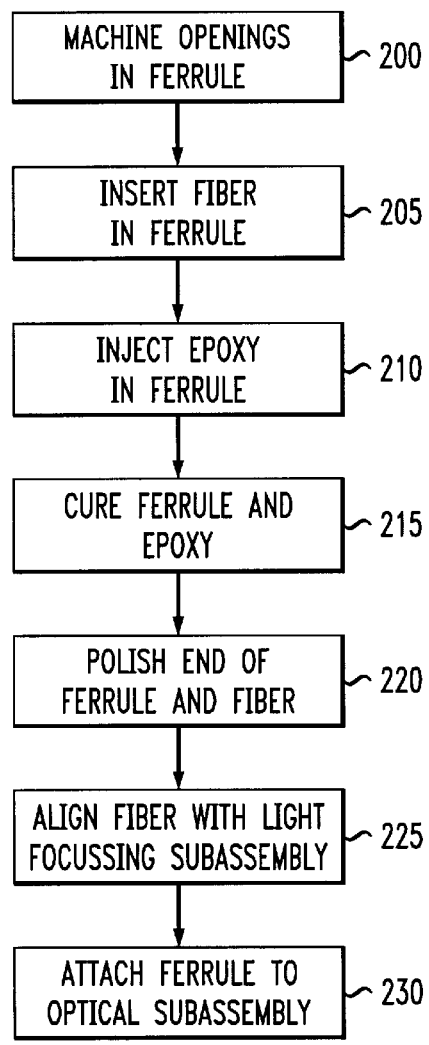
FIG. 10 is a flow diagram illustrating a method for suppressing optical instabilities in an optoelectronic package that can be caused by improperly cured epoxy in accordance with an embodiment of the invention.

FIG. 10 illustrates a method for suppressing optical instabilities in an optoelectronic package 150, shown in FIG. 9, that can occur from improperly cured epoxy. The package 150 includes an optical subassembly 152, upon which are mounted a laser chip 154 and a light focussing subassembly 156. The first step 200 is to prepare the ferrule 120 by machining one or more openings 125 in the ferrule body 122. After preparing the ferrule 120, the fiber 12 is inserted into the ferrule 120 at step 205. After ensuring that the fiber 12 has traversed the jacket channel 16 of the jacket and the ferrule channel 30, the epoxy 40 is injected into the defined interior space 24 of the ferrule 120 at step 210. It should be understood that instead the epoxy 40 can be injected into the defined interior space 24 and then the fiber 12 is inserted into the ferrule 120. Furthermore, it should be understood that the ferrule 120 may be prepared by machining the openings 125 after injection of the epoxy 40. At step 215, the ferrule 120 and the epoxy 40 are cured in a furnace. After an appropriate curing time, the ferrule 120 is removed from the furnace and the end of fiber 12 and the ferrule 120 to be attached to the optoelectronic package 150 are polished at step 220. At step 225, the fiber 12 is next optically aligned with the light focussing subassembly 156. Proper alignment is determined with the use of a light detector 160 which is optically connected to the other end of the fiber 12. Upon obtaining proper alignment, the ferrule 120 is attached to the optical subassembly 150 at step 230, thereby optically coupling said fiber 12 with said light focussing subassembly 156. Attachment may be via epoxy or other adhesive material, or by way of solder, or the ferrule 120 can be laser welded to the optical subassembly 150 by way of a laser 165.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, passive optical devices often include epoxy as a structural element to maintain position of the optical elements. Many designs use long narrow epoxy joints to fix the spatial position of the elements. In such designs, curing of the epoxy can be retarded in the center section of the joint. "Breath" holes in the center section of the joint can be used to eliminate such issues. In another example, integrated circuits can be attached to printed wiring boards, packages, etc., using epoxy. As die size increases, the probability that the epoxy in the center of the die does not fully cure due to the phenomena explained above increases. This is further complicated as the epoxy bond line thickness decreases. Such affects may also occur in optical systems that use large Micro-Electro-Mechanical-Systems (MEMS) devices to redirect light. The MEMS devices can sometimes be very large. For MEMS devices, a hole below the integrated circuit or MEMS die in the board or package could be made to prevent improperly cured epoxy. In applications where the epoxy can flow out through the breath hole and prevent complete coverage from occurring, a reaction gas permeable membrane, such as expanded Teflon, Gore-Tex or weaved fiber, could be applied over the hole. The membrane stops the epoxy from flowing through the hole while maintaining a "breathable" port hole for the reaction gases. Finally, for those applications that require non-filled spaces for proper operation, a non-wettable, moisture and reaction gas transmissive, particle barrier membrane such as Gore-Tex may be used. Accordingly, the invention is not to be seen as limited by the foregoing description, but is only limited by the scope of the appended claims.

What is claimed as new and desired to be protected by Letters Patent of the United States is:

1. An optical fiber assembly, comprising:
    a ferrule having a ferrule body with a thin walled section and a thick walled section, said thick walled section including a channel, said ferrule body extending between first and second ends and defining a defined interior space, wherein one or more openings extend through said thin walled section of said ferrule body to said defined interior space;
    a fiber extending through said ferrule body; and
    a curable material surrounding said fiber within said defined interior space, wherein the size of said openings is chosen to facilitate the escape of reaction gases from the curable material.

2. The optical fiber assembly of claim 1, wherein said thin walled section includes a mid-section, said openings extending through said ferrule body in said mid-section.

3. The optical fiber assembly of claim 2, further comprising a fiber jacket positioned at said first end of said ferrule body, wherein said fiber extends through a channel in said fiber jacket.

4. The optical fiber assembly of claim 3, wherein said defined interior space extends from said thick walled section to said first end and is sized and configured to receive said fiber jacket.

5. The optical fiber assembly of claim 4, wherein said curable material comprises an epoxy which occupies the space in said defined interior space not occupied by said fiber and said fiber jacket, said epoxy adhering said fiber to said channel of said thick walled section.

6. An optical fiber assembly, comprising:
    a ferrule having a ferrule body, with a thin walled section and a thick walled section, extending a length between first and second ends and defining a defined interior space, wherein one or more openings extend through said ferrule body to said defined interior space, wherein a ratio of a total of the diameters of the openings to the length of said ferrule body is in the range of 1:10 to 1:5;
    a fiber extending through said ferrule body; and
    a curable material surrounding said fiber within said defined interior space, wherein the number of said openings is chosen to facilitate the escape of reaction gases from the curable material.

7. The optical fiber assembly of claim 6, wherein said thin walled section includes a mid-section, said openings extending through said ferrule body in said mid-section.

8. The optical fiber assembly of claim 7, further comprising a fiber jacket positioned at said first end of said ferrule body, wherein said fiber extends through a channel in said fiber jacket.

9. The optical fiber assembly of claim 8, wherein said defined interior space extends from said thick walled section to said first end and is sized and configured to receive said fiber jacket.

10. The optical fiber assembly of claim 9, wherein said curable material comprises an epoxy which occupies the space in said defined interior space not occupied by said fiber and said fiber jacket, said epoxy adhering said fiber to said channel of said thick walled section.

11. An optoelectronic package, comprising:
    an optical subassembly; and
    an optical fiber assembly attached to said optical subassembly, said optical fiber assembly including:
        a ferrule having a ferrule body with a thin walled section and a thick walled section, said thick walled section including a channel, said ferrule body extending between first and second ends and defining a defined interior space, wherein a plurality of openings extend through said thin walled section of said ferrule body to said defined interior space;
        a fiber extending through said ferrule body; and
        a curable material surrounding said fiber within said defined interior space, wherein the spacing of said openings is chosen to reduce the amount of reaction gases trapped in the curable material.

12. The optoelectronic package of claim 11, further comprising a laser chip and a light focussing subassembly mounted on said optical subassembly.

13. The optoelectronic package of claim 12, wherein said fiber extends through said defined interior space to optically couple with said light focussing subassembly.

14. The optoelectronic package of claim 13, wherein said currable material comprises an epoxy which stabilizes the positioning of said fiber within said ferrule.

15. The optoelectronic package of claim 14, wherein said ferrule body includes a mid-section, said opening extending through said ferrule body in said mid-section.

16. The optoelectronic package of claim 15, wherein said fiber extends through a fiber jacket positioned at said first end of said ferrule body.

17. The optoelectronic package of claim 11, wherein said ferrule body extends a length and wherein a ratio of a total of the diameters of the openings to the length of said ferrule body is in the range of 1:10 to 1:5.

* * * * *

UNITED STATES PATENT AND TRADEMARK OFFICE
CERTIFICATE OF CORRECTION

PATENT NO. : 6,623,176 B2
DATED : September 23, 2003
INVENTOR(S) : Curtis A. Jack and John W. Osenbach It is certified that error appears in the above-identified patent and that said Letters Patent is hereby corrected as shown below:

<u>Title page,</u>
Item [75], Inventors, delete "Rockland Township" and replace with -- Mertztown --.

<u>Column 5,</u>
Line 40, delete "filly" and replace with -- fully --.

Signed and Sealed this

Second Day of March, 2004

JON W. DUDAS
*Acting Director of the United States Patent and Trademark Office*